Patent text

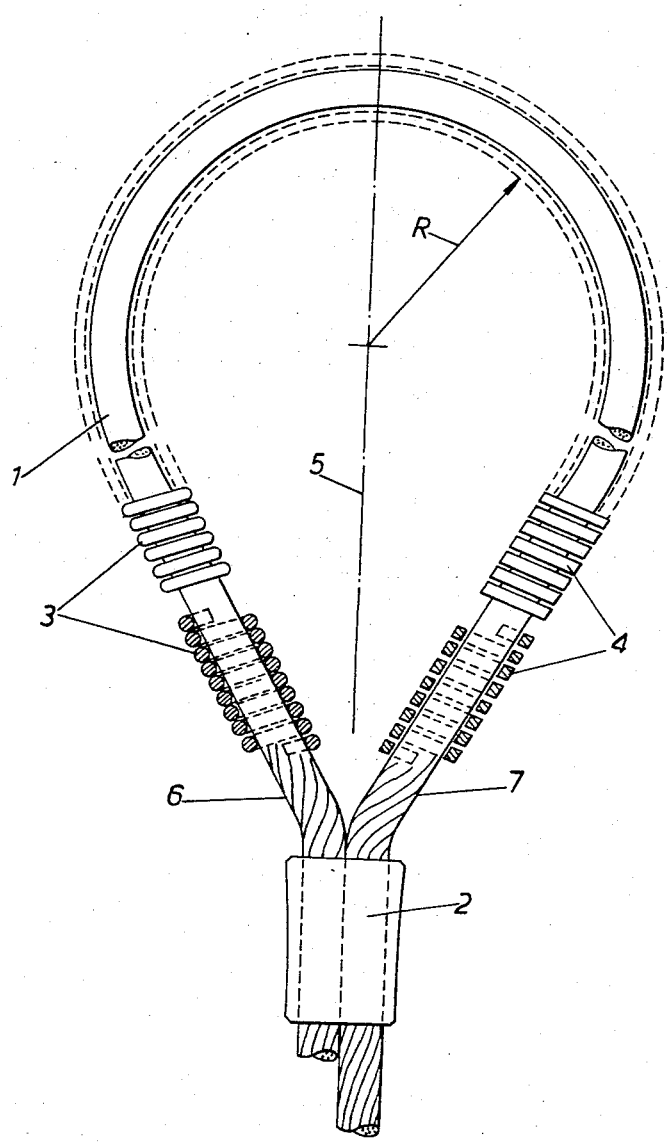

3,338,046
LOOPED WIRE ROPE OR CABLE
Hans Baur, Goggingen, near Augsburg, and Paul Reinhardt, Asslar, Kreis Wetzlar, Germany, assignors to Cable Covers Limited, London, England, a corporation of Great Britain
Filed Dec. 23, 1966, Ser. No. 604,439
Claims priority, application Germany, Dec. 29, 1965, S 101,231
14 Claims. (Cl. 57—145)

This invention relates to a looped wire rope or cable and as is well understood such a loop is conventionally protected by a thimble or the like, which is made of pressed sheet metal and is trough-shaped in cross-section as appropriate to the purpose for which the rope or cable is to be employed. It is found, however, that when subjected to considerable tensile stress, such thimbles are plastically deformed, the loop opening thereby simultaneously becoming longer and narrower. The tendency for such deformation is greatest when the bolt or hook from which the wire-rope or cable is suspended, is of small diameter. Once the thimble has been so deformed it retains the deformed condition and usually has a kinked point which is subject to excessive strains which can destroy the cable. Elimination of the deformation is possible only by time-consuming re-shaping of the thimble. The said known rope or cable thimbles moreover protect only the inner side of the loop of the cable, the outer side is uncovered and is exposed to damage which sometimes results in breaking of individual wires and thus in weakening the cable. Further, projecting broken individual wires can be a hazard to personal safety. Another disadvantage of the known cable thimbles is that there must be a thimble specific for each loop size, or alternatively the size of the loop must be adapted to the available thimble, and the trough-shaped cross-section of the thimbles must always correspond to the diameter of the cable.

It is a main object of the invention to provide looped wire rope or cable which is fitted with a thimble which is not subject to the above-mentioned disadvantages.

According to the invention there is provided a looped wire rope or cable having an end portion thereof formed into a loop held in position by a sleeve or by splicing, wherein said end portion is surrounded by a coil spring having an internal diameter greater than the diameter of the cable and which is so dimensioned that following the relief of a tractile force which effects deformation of the loop the spring acts on the loop to restore the shape thereof and is not subject to longitudinal plastic deformation.

In order that the invention may be clearly understood two embodiments thereof will now be described, by way of example, with reference to the accompanying drawing which illustrates the looped end of a wire rope or cable fitted with two alternative kinds of coiled spring in accordance with the invention.

Referring to the drawing, an end portion of a wire rope or cable 1 is bent into a loop in conventional manner and is held together, in known manner, by means of suitable holding means such as a mass-produced sleeve 2, or by splicing.

An end portion of the wire rope or cable 1 is surrounded by a coil spring 3 or 4, the spring 3 shown on the left-hand side of the centre line 5 consists of round-section spring wire with adjacent turns which lie close to each other, or contact each other. This spring may be coated with a protective material such as a plastics material or rubber.

The coil spring 4 shown on the right-hand side of the centre line 5 consists of square-section spring wire, the individual coils having a gap between them. The gap may be so selected that the individual coils are in contact, or lie very close to each other, in the region of the curvature indicated by the radius R.

When the coil spring is made of round-section spring wire, as described above, the internal diameter of the spring may be up to 6.5 mm., and when the coil spring is made of square-section wire the internal diameter may be greater than 6.5 mm. For an internal diameter of up to 6 mm., the use of a close-wound coil spring is advantageous, because a coil spring of this kind may, as mentioned above, be coated and thus be employed for use with coated cables.

Coil springs having an internal diameter greater than 6.5 mm. must have the coils spaced apart so that they may flex without difficulty on forming the loop. The bending action, occurring together with that performed on the wire rope or cable, would be difficult in the case of close-wound coils.

The coil spring may advantageously have the ends thereof arranged to be spaced from but close to the sleeve 2 or splicing position so that it is not caught therein.

The spring can be produced in an economic manner by cutting a piece of appropriate length from a coil spring produced in considerable length produced by a continuous process. By this means storage problems are greatly simplified because it is not necessary to keep a multiplicity of individual pieces in stock.

In some instances it may be advantageous to employ a coil spring consisting of a median and two terminal sections, the coils of the spring being spaced apart and the spacing between the coils of the median section being less than that between the coils of the terminal sections. The spacing between the coils of the median section may be between 0.5 and 1 mm. and the spacing between the coils of the terminal sections between 2 and 5 mm. A substantially continuous contact surface is obtained with a spring of this kind in the area of the loop in which it bears on a crane hook or the like, whereas the greater spacing between coils towards the extremities of the spring offers a substantial saving of spring material and thus of weight and cost.

When using springs having spaces between the coils, particularly larger springs which are intended for ropes or cables to raise considerable loads, it is advantageous for the end portions of the spring to bear under compression or thrust against the sleeve 2 or the splicing position holding the loop together. This prevents the spring from being displaced on the wire rope or cable and prevents spring tension from incessantly and automatically opening out the loop.

It will be understood that the use of a coil spring as described herein provides circumferential protection so that the outer side of the rope or cable is also protected. Thus, if an individual wire were to break for some reason the danger of personal injury is lessened. Further, it is not necessary to retain in stock a spring for each size of loop or cable because springs of the required length may be cut from a coil spring of greater length. The inner diameter of the coil spring does not correspond precisely to the diameter of the rope or cable, and it is sufficient for example, for the rope or cable to be insertible with a clearance of at least 0.5 mm. This clearance renders it possible to have coil springs available for all rope or cable diameters from a small number of coil springs, the internal diameters of which are different. It is thus possible for example, to manage with say eight different coil springs for wire rope or cable diameters of up to 30 mm.

We claim:
1. A cable having an end portion thereof formed into a loop and held in position by a holding means, wherein said end portion is surrounded by a coil spring having an internal diameter greater than the diameter of the cable and which is so dimensioned that following the relief of a tractile force which effects deformation of the loop the spring acts on the loop to restore the shape thereof and is not subject to longitudinal deformation.

2. A cable according to claim 1, wherein the coil spring is made of spring wire.

3. A cable according to claim 1, wherein the coil spring is made of round-section wire and has an internal diameter not greater than 6.5 mm.

4. A cable according to claim 3, wherein the end portions of the spring compressively bear against the said holding means.

5. A cable according to claim 1, wherein the coil spring is made of rectangular section wire and has an internal diameter not less than 6.5 mm.

6. A cable according to claim 5, wherein the end portions of the spring compressively bear against the said holding means.

7. A cable according to claim 1, wherein the coil spring has close-wound coils and is coated with a protective material such as a plastics material.

8. A cable according to claim 1, wherein the coils of the coil spring are in contact with each other at least at the inner side of the loop in the region of the loop curvature.

9. A cable according to claim 8, wherein the coils of the spring contact each other in surrounding the loop.

10. A cable according to claim 1, wherein the spring consists of a median and two terminal sections and the coils are spaced apart, the spacing between the coils of the median section being less than that between the coils of the terminal sections.

11. A cable according to claim 10, wherein the spacing between the coils of the median section is between 0.5 mm. and 1 mm. and the spacing between the coils of the terminal sections is between 2 mm. and 5 mm.

12. A cable according to claim 10, wherein the end portions of the spring compressively bear against the said holding means.

13. A cable according to claim 11, wherein the end portions of the spring compressively bear against the said holding means.

14. A cable according to claim 1, wherein the end portions of the spring are spaced from but are close to the said holding means.

References Cited

UNITED STATES PATENTS

| | | | |
|---|---|---|---|
| 893,555 | 7/1908 | Sullivan | 57—142 |
| 1,970,702 | 8/1934 | Kuney | 57—145 X |
| 1,983,962 | 12/1934 | Barber et al. | 57—145 X |
| 2,325,261 | 7/1943 | Mazzella | 57—156 |
| 2,456,015 | 12/1948 | Orser | 28—1 X |
| 3,018,319 | 1/1962 | Quayle | 57—142 X |
| 3,079,192 | 2/1963 | Otley | 57—142 X |
| 3,120,734 | 2/1964 | Peterson et al. | 57—142 |

FOREIGN PATENTS

| | | |
|---|---|---|
| 322,612 | 10/1902 | France. |
| 23,906 | 1907 | Great Britain. |

FRANK J. COHEN, *Primary Examiner.*

D. E. WATKINS, *Assistant Examiner.*